March 10, 1942.     E. W. BOEHNE     2,275,839
MAGNETIC STRUCTURE
Filed Jan. 27, 1940
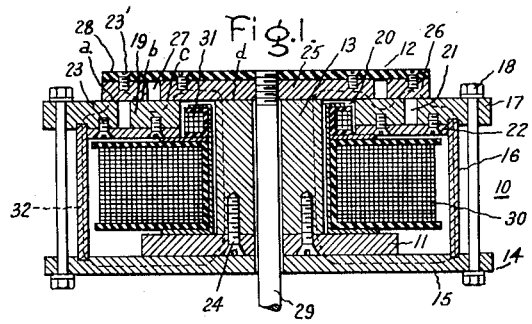
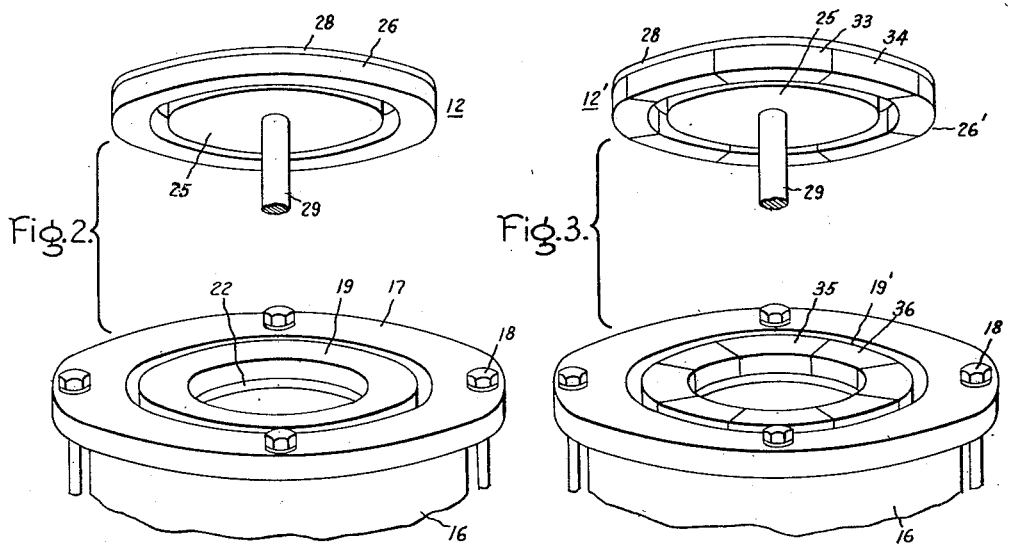
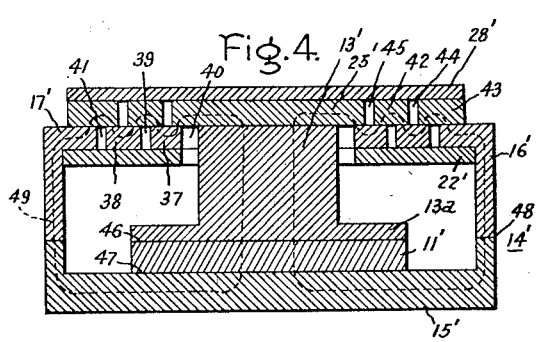
Inventor:
Eugene W. Boehne,
by Harry E. Dunham
His Attorney.

Patented Mar. 10, 1942

2,275,839

UNITED STATES PATENT OFFICE 2,275,839

MAGNETIC STRUCTURE

Eugene W. Boehne, Drexel Hill, Pa., assignor to General Electric Company, a corporation of New York Application January 27, 1940, Serial No. 315,982

5 Claims. (Cl. 175—367)

This invention relates to magnets and more particularly to magnetic structures of the lifting or holding type and has for its object the provision of magnets of this character having improved characteristics and which are capable of producing maximum attractive force between the magnet poles and a relatively movable armature or keeper element.

The present application is a continuation in part of my co-pending application, Serial No. 248,783, filed December 31, 1938, and entitled "Electromagnetic apparatus."

In carrying my invention into effect in its preferred form, I provide a permanent magnet element which is preferably composed of a magnetic material having a high coercive force and which is provided with pole pieces of relatively high permeability magnetic material for concentrating the flux of the magnet in a plurality of working air gaps. A flux-carrying element comprising at least one member of high permeability magnetic material is positioned between and in spaced relation with the opposite polarity portions of a magnetic structure which includes the permanent magnet. Cooperating with these opposite polarity portions and this flux-carrying element is a relatively movable armature or keeper element composed of at least two relatively fixed segments of high permeability magnetic material separated by a gap. When the movable armature element is in the operating position each of the magnetic segments thereof is positioned in overlapping relation with one of the gaps of this flux-carrying element and in contact with the respective magnetic members which are arranged on opposite sides of this gap. With this construction, each of the useful lines of magnetic flux produced by the permanent magnet in passing from one pole piece to the other traverses a minimum of four working air gaps so that the total useful flux is, therefore, gainfully employed a plurality of times. Consequently, the attractive force or holding power of the magnet is greatly increased over that obtainable with conventional magnets.

The novel features which are characteristic of my invention are pointed out in the appended claims. My invention, however, will be understood more readily with reference to the following specification when considered in connection with the accompanying drawing in which Fig. 1 is a sectional elevation view of a holding magnet constructed in accordance with my invention; Fig. 2 is an exploded perspective view of the arrangement of Fig. 1 showing the arrangement of the series flux-carrying element and the movable armature element; Fig. 3 is a modification of the arrangement of Fig. 2; and Fig. 4 is a sectional elevation view of a modified form of lifting or holding magnet constructed in accordance with my invention.

Referring to Figs. 1 and 2 of the drawing, I have illustrated a magnetic structure 10 comprising a flux producing member such as a permanent magnet element 11 adapted to produce a flux for attracting a movable armature element 12 against an opposing force (not shown). The illustrated magnet element 11 is of disk-shaped form and is mounted in a magnetic circuit including a central pole piece 13 and a yoke 14 comprising an annular disk 15 and a cylindrical member 16. The numeral 17 designates a second pole piece in the form of an annulus which is joined rigidly to the cylindrical portion 16 of the yoke 14 by means of a plurality of bolts 18. Secured in concentric and relatively fixed relation intermediate the pole pieces 13 and 17 is a flux carrying member comprising at least one annulus 19 of magnetic material which is spaced relative to the central pole piece 13 by an annular gap 20 and which is spaced from the outer pole piece or annulus 17 by an annular gap 21. The pole piece faces or surfaces and the face or surface of the flux carrying member 19 form a single plane surface. The annulus 19 is held in fixed and spaced relation with respect to the pole pieces 13 and 17 by means of a thin member 22 in the form of an annulus composed of a suitable non-magnetic material, such as brass, which is shown secured to the outer pole piece 17 and the annulus 19 by means of a plurality of screws 23. Similarly, I may provide a plurality of screws 24 for firmly securing the permanent magnet element 11 and the central pole piece 13 in fixed relation.

In the illustrated embodiment, the movable armature element 12 comprises a plurality of concentrically arranged holding surfaces of magnetic material including a central disk portion 25 and an outer flux carrying member in the form of an annulus or ringlike member 26 which is spaced from the disk member 25 to form an annular gap 27. The faces or surfaces of the disk portion and the flux carrying member 26 form a second single plane surface, the plane surfaces being disposed so that complete and intimate engagement between surfaces is had when the armature is held against the flux producing member. A disk-like member 28 of suitable non-magnetic material, secured to the parts 25 and 26 by any suitable means such as screws 23', serves to maintain them in fixed relation with respect to each other. The armature element 12 is shown connected to an operating rod 29.

In the construction of the permanent magnet element 11, I prefer to employ a magnetic material having considerably higher coercive force than the usual chrome magnet steels and an example of such material which may be used is cobalt steel. It is not my intention, however, that my invention shall be limited to the employment of a particular magnetic material. I have found that highly satisfactory results may be obtained by the use of permanent magnet alloys containing iron, nickel, and aluminum as the basic or essential ingredients. Alloys of this character for the production of permanent magnets are well known and magnets composed of such alloys not only have a high coercive force but they also exhibit a fairly high residual induction with the result that they are capable of producing a maximum amount of magnetic energy with a minimum volume of magnetic material. They are also highly resistant to demagnetizing influences.

In the construction of the members 13, 14, 17, 19, 25 and 26, which carry magnetic flux, I prefer to employ a material having a relatively high permeability, such for example, as steel or soft iron. By employing a magnetic material of this character a high flux density is obtained at the working air gaps and, at the same time, the permanent magnet is operated at its most efficient flux density; in other words, the flux may be concentrated in the working air gaps without affecting the flux density in the magnet.

My co-pending application, already referred to, discloses a device of the character shown in Fig. 1 as applied to the operation of a circuit breaker. In connection with the operation of such a device, it is desired that there be suitable means for applying a sufficient force on the movable armature 12, which is normally biased to the open position by means such as a spring (not shown), to cause the armature to be moved to the closed position as indicated in Fig. 1. An electrical coil 30, adapted to be energized from a suitable source of supply, may be employed for providing this force. Furthermore, in the operation of such circuit breakers, it is desired that the breaker be released quickly upon the happening of a certain abnormal condition. A second electrical current-carrying coil 31 is, therefore, provided and is adapted to produce a flux in opposition to the flux of the permanent magnet member 11. This opposing flux of the coil 31 is effective to cause release of the armature element 12 by reducing the holding force at the adjacent holding surfaces below the opposing force of the spring (not shown) which is exerted through the operating rod 29. With this arrangement it will be seen that even though the flux density in the magnet 11 decreases when the armature element 12 is moved to the open position, the flux density rises again due to the magnetomotive force produced by the coil 30 when the latter is energized to operate the armature 12 from the open position to the position shown in Fig. 1, where it is then held by the attractive force of the magnet.

Referring again to Fig. 1 of the drawing, it will be seen that the annular gaps 20 and 21 are arranged in staggered relation with respect to the annular gap 27 of the armature 12 so that the magnetic element 25 of the movable armature 12 overlaps the inner pole piece 13 and the annulus 19 thereby shunting or bridging the gap 20. Similarly, the magnetic element 26 of the armature 12 overlaps the outer pole piece 17 and the annulus 19 thereby bridging or shunting the gap 21. Further reference to Fig. 1 shows that the segments or magnetic members are so dimensioned and offset with respect to each other and the pole pieces that each member bridges only one gap and engages only the magnetic material on either side of the gap so that any useful lines of magnetic flux emanating from the permanent magnet 11, as indicated by the dotted lines 32, always traverse a minimum of four working air gaps or holding surfaces such as $a$, $b$, $c$, and $d$ in passing from one of the pole pieces to the other. The reluctance of the working gaps $a$, $b$, $c$, and $d$ is made relatively small as compared to that of the annular air gaps 20, 21, and 27, with the result that only a negligible amount of the flux produced by the magnet element 11 flows directly through these annular air gaps, the main flux being shunted around them through an auxiliary flux path including the series of working air gaps and the intermediate members of magnetic material. The area of these holding surfaces is of course designed so that it is an optimum with respect to the magnetic flux produced by the magnet 11. In the arrangement illustrated, the contact areas at $a$, $b$, $c$, and $d$ are all equal and pass the same flux. Each area or surface thus produces the same attractive force on the movable armature 12.

In an arrangement of the foregoing character the magnetic flux of the magnet is used several times thereby greatly increasing the pull on the movable armature. For example, I have found that, by the use of a magnetic structure having four series working gaps threaded by the useful flux, the attractive force tending to hold the movable armature element in the closed position is increased approximately seventy per cent over that obtained with conventional magnets in which only two working air gaps are employed.

The reason for the greatly improved result obtained by the use of apparatus arranged according to the present invention may be explained as follows: Upon first observation it would seem that if the permanent magnet element 11 is operating at its maximum magnetic efficiency with the conventional two series working air gaps in the circuit, the addition of another working gap would reduce the holding power rather than increase it. However, this would be true only if the equivalent reluctance of the two pull gaps constituted the whole external reluctance of the circuit. Actually the magnetic circuit includes a fixed external reluctance due to the pole pieces, the yoke, and the fixed gaps consisting of joints at the points where the parts make contact with each other and with the magnet. This fixed reluctance is normally several times as great as the reluctance of the two working air gaps, where the parts are placed in close contact, so that the addition of another working gap of the same equivalent reluctance as one of the usual gaps will not cause as great an increase in demagnetization of the magnet as the first two gaps because it does not produce the same proportional increase in the total reluctance of the magnetic circuit; consequently, the per cent of magnetic energy which is wasted in the fixed reluctance of the magnetic circuit becomes smaller as the number of working gaps and length of magnet are increased.

Whether or not the foregoing reason is correct, the fact remains that holding or lifting magnets constructed according to the present invention have been tested under operating conditions and found to have materially greater attractive force or holding ratio than magnets of similar size made according to prior designs.

Referring to Fig. 3, I have illustrated a modification whereby the attractive force exerted on the movable armature 12 of Figs. 1 and 2 may be varied between wide limits by altering the contact area at the working air gaps. In the arrangement illustrated, the movable armature 12' comprises a central disk-shaped member 25 and an outer spaced annulus 26' which, instead of being a continuous steel or iron member as in Figs. 1 and 2, is composed of alternate sections 33 and 34 of magnetic and non-magnetic material, respectively. For coacting with the armature 12' the inner concentric annulus 19 of Figs. 1 and 2 is similarly replaced by an annulus 19' composed of alternate sections 35 and 36 of magnetic and non-magnetic material, respectively. Thus, by rotating the movable armature 12' to the desired position, the area of each of the magnetic portions 33 of the movable armature which contact the respective areas 35 of the annulus 19' may be altered, thereby determining the attractive force of the magnet.

In Fig. 4, I have illustrated a modification of Figs. 1 and 2 in which the number of holding surfaces is increased to six by the employment of a magnetic structure having a flux carrying member comprising two annular magnetic segments 37 and 38 which are spaced from each other by an annular gap 39. The inner magnetic segment 37 is positioned in spaced relation with a central or inner pole piece 13' to form an annular air gap 40. Similarly, the outer magnetic segment 38 is positioned in spaced relation with an outer annular pole piece 17' to form an annular air gap 41. I wish to call attention to the shape of the central pole piece 13' wherein the lower end portion 13a is made of a larger diameter or cross-sectional area than the rest of the pole piece in order to cover the adjacent polar surface of a permanent magnet 11'. By means of this construction the flux of the magnet is utilized most effectively. It will be appreciated that a pole piece such as 13' may replace the pole piece 13 in the arrangement of Fig. 1 if desired. Similarly, to the arrangement of Figs. 1 and 2, the armature element in Fig. 4 is provided with a central disk member 25' and two concentric magnetic rings 42 and 43 which are relatively fixed with respect to each other and spaced from each other to form an annular air gap 44, while the intermediate annulus 42 is spaced from the central magnetic disk to form an annular air gap 45.

The cylindrical yoke member 16 and the annular pole piece element 17 of Fig. 1 are replaced by an integral construction in the form of a cylindrical member 16' having a flanged or in-turned end portion 17' forming a pole piece. It is preferred, in this case, to construct the disk member 28' and the thin annulus 22' of a suitable non-magnetic material such as brass in order that a welding or soldering process may be employed for uniting the disk 28' to the magnetic members 25', 42 and 43 of the armature, and for securing the annulus or ring 22' to the magnetic members 17', 37 and 38. The joints 46 and 47 formed between the permanent magnet and the magnetic members 13' and 15' may be made with highly satisfactory results by a soldering process of the character described and claimed in the United States patent to Goodwin H. Howe, No. 2,169,098, August 8, 1939. The parts 15' and 16' may be joined together at 48 in any suitable manner such as by a welding operation.

Inspection of Fig. 4 shows that each of the flux paths as illustrated by the dotted line 49 now includes 6 working air gaps or holding surfaces. The holding ratio or attractive power may be further increased by the addition of still more magnetic segments to the movable armature element and to the series flux-carrying path of the stationary portion of the magnetic structure. In general as to the optimum number of holding surfaces or working air gaps which should be employed with a given magnet, it may be stated that the number may be increased to advantage until the attendant increase in reluctance due to the addition of another gap produces a drop in the flux density in the working air gaps without an increase in the total attractive force.

In the arrangements of Figs. 1 to 4 I have shown permanent magnets for producing the necessary flux to maintain the movable armature element in a given position, but I wish to point out that the principles of my invention may likewise be employed in connection with arrangements in which the magnetic flux is produced by an electrical current-conducting coil. For example, the magnetic structure of Fig. 1 may be employed as a holding magnet with either the permanent magnet element 11 or the electrical coil 30 providing the necessary flux for holding the movable armature element.

It will thus be seen that, by the use of a magnetic circuit employing more than two series working air gaps, I have obtained a magnet having a greatly increased holding ratio.

In general, it may be stated that the number of series working gaps or holding surfaces traversed by the magnetic flux in passing between the pole pieces, is equal to twice the number of magnetic members composing the armature element. Stated in a different way, the number of series working gaps is also always one less in number than the sum of the magnetic members or segments composing the armature and the flux carrying member of the magnetic circuit, there being in any event a minimum of four series working air gaps or holding surfaces. Magnets of this character may be found particularly useful in applications where a tenacious attractive force is required between two relatively movable magnetic members.

In accordance with the provisions of the patent statutes, I have described the principle of operation of my invention in connection with magnetic structures employing concentric pole piece members but I desire to have it understood that the apparatus shown is only illustrative and that the invention may be carried out by other means.

What I claim as new and desire to secure by Letters Patent of the United States is:

1. In combination in a magnetic structure, a magnetic circuit including a source of magnetic flux, a pair of pole pieces, and a series flux carrying member comprising a magnetic segment positioned between and in spaced relation with said pole pieces, said segment and said pole pieces forming a single plane surface, and an armature having a pair of spaced coacting magnetic holding surfaces, said surfaces being relatively fixed with respect to each other to cooperate as a unit, said surfaces forming a second single plane surface, said plane surfaces completely and intimately engaging each other when the armature is held against the flux producing member, said armature surfaces being arranged and dimensioned with respect to said pole pieces and said series flux carrying member when in the attracted position such that said magnetic segment bridges only the gap between said magnetic holding surfaces, one of said magnetic holding surfaces bridges only the gap between one of said pole pieces and said magnetic segment and the other of said magnetic holding surfaces bridges only the gap between said magnetic segment and the other of said pole pieces whereby substantially all of said magnetic flux threads said armature at four series holding surfaces in passing from one of said pole pieces to the other.

2. In a magnet of the lifting or holding type, a magnetic circuit comprising a permanent magnet element, a pair of high permeability pole pieces and a segmented member of magnetic material, said segmented member including a plurality of relatively spaced segments and said member being securely positioned between and arranged to form a gap with each of said pole pieces, said segments and said pole pieces forming a single plane surface, a relatively movable armature element having a plurality of spaced and relatively fixed magnetic segments, said magnetic segments being one greater in number than the magnetic segments composing the segmented member of said magnetic circuit, said armature segments forming a second single plane surface, said plane surfaces completely and intimately engaging each other when the armature is held against the flux producing member, said armature element being so dimensioned and positioned in operative relation to form working air gaps with said magnetic circuit in such a manner that each magnetic segment of said armature bridges only a single gap and engages only the two magnetic segments on either side of the gap in said magnetic circuit, whereby the useful flux produced by said magnet element in passing between said pole pieces crosses a series of working air gaps one greater than the sum of the magnetic segments composing said segmented member and said armature element.

3. In combination in a lifting or holding magnet, a flux producing element, a magnetic circuit including said flux producing element, a central pole piece, a second pole piece and an annular flux carrying member comprising at least one annulus of magnetic material, said second pole piece being arranged in concentric and spaced relation with respect to said central pole piece, said flux carrying member being positioned in the space between said pole pieces and forming an annular gap with each of said pole pieces, said flux carrying member and said pole pieces forming a single plane surface, and a relatively movable armature element comprising a central disk-shaped member of magnetic material and an outer relatively fixed concentric and relatively spaced flux carrying member comprising an annulus of magnetic material and forming an annular gap with said disk-shaped member, the magnetic members comprising said armature forming a second single plane surface, said plane surfaces completely and intimately engaging each other when the armature is held against the flux producing member, said magnetic members being so dimensioned and offset radially that each member bridges only one of said annular gaps, whereby each of the flux lines produced by said flux producing element traverses at least four series working gaps in passing from one of said poles to the other.

4. In combination in a magnetic structure, a magnetic circuit including a flux producing element, a central pole piece of magnetic material, a second pole piece of magnetic material, and a flux carrying member comprising a plurality of annular members of magnetic material, said annular members being radially spaced relative to each other, means securing said flux carrying member in substantially concentric position between said pole pieces and with the respective annular magnetic members which lie adjacent said poles being radially spaced therefrom, said means serving further to maintain said annular members in fixed relation to each other, said member and said pole pieces forming a single plane surface, and an armature element comprising a central member of magnetic material and a plurality of concentric and relatively spaced annular members of magnetic material, means securing the central member and the annular members of said armature in relatively fixed relation, said armature members forming a second single plane surface, said plane surfaces completely and intimately engaging each other when the armature is held against the flux producing member, said members of magnetic material composing said armature being so dimensioned and positioned with respect to said pole pieces and the annular members of said flux carrying member when the armature is in the operating position that each magnetic member of said armature bridges only one gap of said magnetic circuit and engages only the magnetic material of said magnetic circuit on opposite sides thereof, whereby the flux produced by said flux producing element is caused to traverse a number of series working air gaps equal to twice the number of magnetic members composing said armature.

5. In combination in a lifting or holding magnet, a magnetic circuit including a flux producing element, a central pole piece, a second pole piece of annular construction arranged in substantially concentric and spaced relation with respect to said central pole piece, and an annular member composed of circumferentially disposed sections of alternate magnetic and non-magnetic material, said annular member being arranged in the space between said pole pieces and forming a gap with each of said pole pieces, said sections and said pole pieces forming a single plane surface, and a relatively movable armature element comprising an outer annular member and a relatively fixed central member spaced from said outer member to form a gap, said members forming a second single plane surface, said plane surfaces completely and intimately engaging each other when the armature is held against the flux producing member, the members comprising said armature element being arranged so that each bridges only one of the respective gaps in said magnetic circuit and cooperates in overlapping relation respectively with one of said pole pieces and the annular member positioned between said pole pieces, one of the members of said armature element being constructed of magnetic material and the other member of said armature being composed of alternate magnetic and non-magnetic circumferentially disposed sections, said armature member being further arranged for rotation to different angular positions whereby the area of contact between the magnetic sections of said annular member and said sectioned armature member may be adjusted to vary the holding power of said magnet.

EUGENE W. BOEHNE.